(12) United States Patent
Batinich et al.

(10) Patent No.: US 10,599,497 B2
(45) Date of Patent: Mar. 24, 2020

(54) INVOKING ENHANCED PLUG-INS AND CREATING WORKFLOWS HAVING A SERIES OF ENHANCED PLUG-INS

(71) Applicant: INTERNATIONAL BUSINESS MACHINES CORPORATION, Armonk, NY (US)

(72) Inventors: Mark D. Batinich, North Aurora, IL (US); Pietro Iannucci, Rome (IT); Linwood E. Loving, Mechanicsville, VA (US); Allison V. Pelt, Mahwah, NJ (US); Luigi Pichetti, Rome (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 141 days.

(21) Appl. No.: 15/497,717

(22) Filed: Apr. 26, 2017

(65) Prior Publication Data

US 2018/0316777 A1   Nov. 1, 2018

(51) Int. Cl.
*G06F 15/16*   (2006.01)
*G06F 9/54*    (2006.01)
(Continued)

(52) U.S. Cl.
CPC .......... *G06F 9/547* (2013.01); *G06F 9/44526* (2013.01); *H04L 67/02* (2013.01); *H04L 67/10* (2013.01); *H04L 67/34* (2013.01)

(58) Field of Classification Search
CPC ......... H04L 67/02; H04L 67/10; H04L 67/32; H04L 41/20
See application file for complete search history.

(56) References Cited

U.S. PATENT DOCUMENTS 8,942,960 B2   1/2015  Round et al.
9,477,495 B2   10/2016 Fulton
(Continued)

OTHER PUBLICATIONS

Disclosed Anonymously, "System and Method to provide Mobile Application Virtualization in Cloud Paradigm", IP.com, Nov. 29, 2012, 6 pages.

(Continued)

*Primary Examiner* — Yves Dalencourt
(74) *Attorney, Agent, or Firm* — James Nock; Andrew D. Wright; Roberts Mlotkowski Safran Cole & Calderon, P.C.

(57) ABSTRACT

A computer-implemented method includes: receiving, by a computing device, information for composing a first enhanced plug-in, wherein the first enhanced plug-in includes one or more logical components for invoking the first enhanced plug-in by an application running in a different framework as the first enhanced plug-in; receiving, by the computing device, information for creating a workflow that includes a series of a plurality of enhanced plug-ins including the first enhanced plug-in and one or more subsequent second enhanced plug-ins; and invoking, by the computing device, the workflow, wherein the invoking the workflow causes the first enhanced plug-in to receive data from an application running on the same or different framework as the first enhanced plug-in, process the data, and forward the processed data as input data to a particular one of the one or more subsequent second enhanced plug-ins or an endpoint application.

20 Claims, 8 Drawing Sheets

(51) Int. Cl.
*H04L 29/08* (2006.01)
*G06F 9/445* (2018.01)

(56) References Cited

U.S. PATENT DOCUMENTS

| | | |
|---|---|---|
| 2005/0131941 A1* | 6/2005 | Dettinger ................ G06F 16/20 |
| 2005/0210263 A1* | 9/2005 | Levas ..................... G06F 21/33 |
| | | 713/182 |
| 2007/0067425 A1* | 3/2007 | McKinney ............. G06Q 10/00 |
| | | 709/223 |
| 2015/0212812 A1 | 7/2015 | Tripathi et al. |
| 2015/0220404 A1 | 8/2015 | Borden et al. |
| 2016/0004565 A1* | 1/2016 | Harper ................. G06F 9/4881 |
| | | 718/102 |
| 2016/0274946 A1 | 9/2016 | Tanaka |
| 2017/0161057 A1 | 6/2017 | Khazanchi et al. |
| 2017/0235848 A1* | 8/2017 | Van Dusen ............. H04L 41/04 |
| | | 705/12 |

OTHER PUBLICATIONS

Disclosed Anonymously, "Method and system for managing function modules dynamically in OSGi based web applications", IP.com, Aug. 30, 2010, 9 pages.
IBM, "Mechanism for adding standard and predefined code and file(s) to any EXISTING OSGi plug-in project within the Eclipse IDE", IP.com, Dec. 3, 2009, 3 pages.
Anonymous, "Oracle WebLogic Server 12.1.3 Developing with WebLogic Server", Oracle, Jun. 2014, 43 pages.
Anonymous, "Tutorial: Using REST and OSGi Standards for Micro Services", https://wiki.eclipse.orgiTutorial:_Using_REST_and_OSGi_Standards_for_Micro_Services, Eclipse, Sep. 28, 2015, 4 pages.
Mell et al., "The NIST Definition of Cloud Computing", NIST, Special Publication 800-145, Sep. 2011, 7 pages.
List of IBM Patents or Patent Applications Treated as Related, dated Dec. 10, 2019, 1 page.
Specification "Invoking Enhanced Plug-Ins and Creating Workflows Having a Series of Enhanced Plug-Ins" and Drawings in U.S. Appl. No. 16/677,803 filed Nov. 8, 2019, 45 pages.

* cited by examiner

INVOKING ENHANCED PLUG-INS AND CREATING WORKFLOWS HAVING A SERIES OF ENHANCED PLUG-INS

BACKGROUND

The present invention generally relates to software plug-ins and, more particularly, to enhanced plug-ins for streamlining the invoking of services and creating workflow integrations.

Software plug-ins, such as JAVA plug-ins, are used to create and incorporate new software functions in a dynamic and practical way by simply deploying the plug-ins into a standard framework. The services provided by the plug-ins can be invoked by other applications through programmatic calls.

SUMMARY

In an aspect of the invention, a computer-implemented method includes: receiving, by a computing device, information for composing a first enhanced plug-in, wherein the first enhanced plug-in includes one or more logical components for invoking the first enhanced plug-in by an application running in a different framework as the first enhanced plug-in; receiving, by the computing device, information for creating a workflow that includes a series of a plurality of enhanced plug-ins including the first enhanced plug-in and one or more subsequent second enhanced plug-ins; and invoking, by the computing device, the workflow, wherein the invoking the workflow causes the first enhanced plug-in to receive data from an application running on the same or different framework as the first enhanced plug-in, process the data, and forward the processed data as input data to a particular one of the one or more subsequent second enhanced plug-ins or an endpoint application.

In an aspect of the invention, there is a computer program product for creating a workflow using a chained series of a plurality of enhanced plug-ins. The computer program product includes a computer readable storage medium having program instructions embodied therewith, the program instructions executable by a computing device to cause the computing device to: store a first enhanced plug-in, of the plurality of enhanced plug-ins, wherein the first enhanced plug-in includes one or more logical components for invoking the first enhanced plug-in by an application running in a different framework as the first enhanced plug-in; receive data from the application running on the same or different framework as the first enhanced plug-in; process the data in accordance with functions defined within the first enhanced plug-in; and forward the data to a subsequent second enhanced plug-in or endpoint application.

In an aspect of the invention, a system includes: a CPU, a computer readable memory and a computer readable storage medium associated with a computing device; an enhanced plugin stored by the computing device, wherein the enhanced plugin includes: one or more logical components for invoking the enhanced plug-in by an application running in a different framework as the enhanced plug-in; one or more logical components for implementing business logic that define the manner in which the enhanced plug-in processes input data; one or more logical components to forward data processed by the business logic or configuration parameters of the enhanced plug-in to subsequent enhanced plug-ins or an endpoint application in a workflow.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
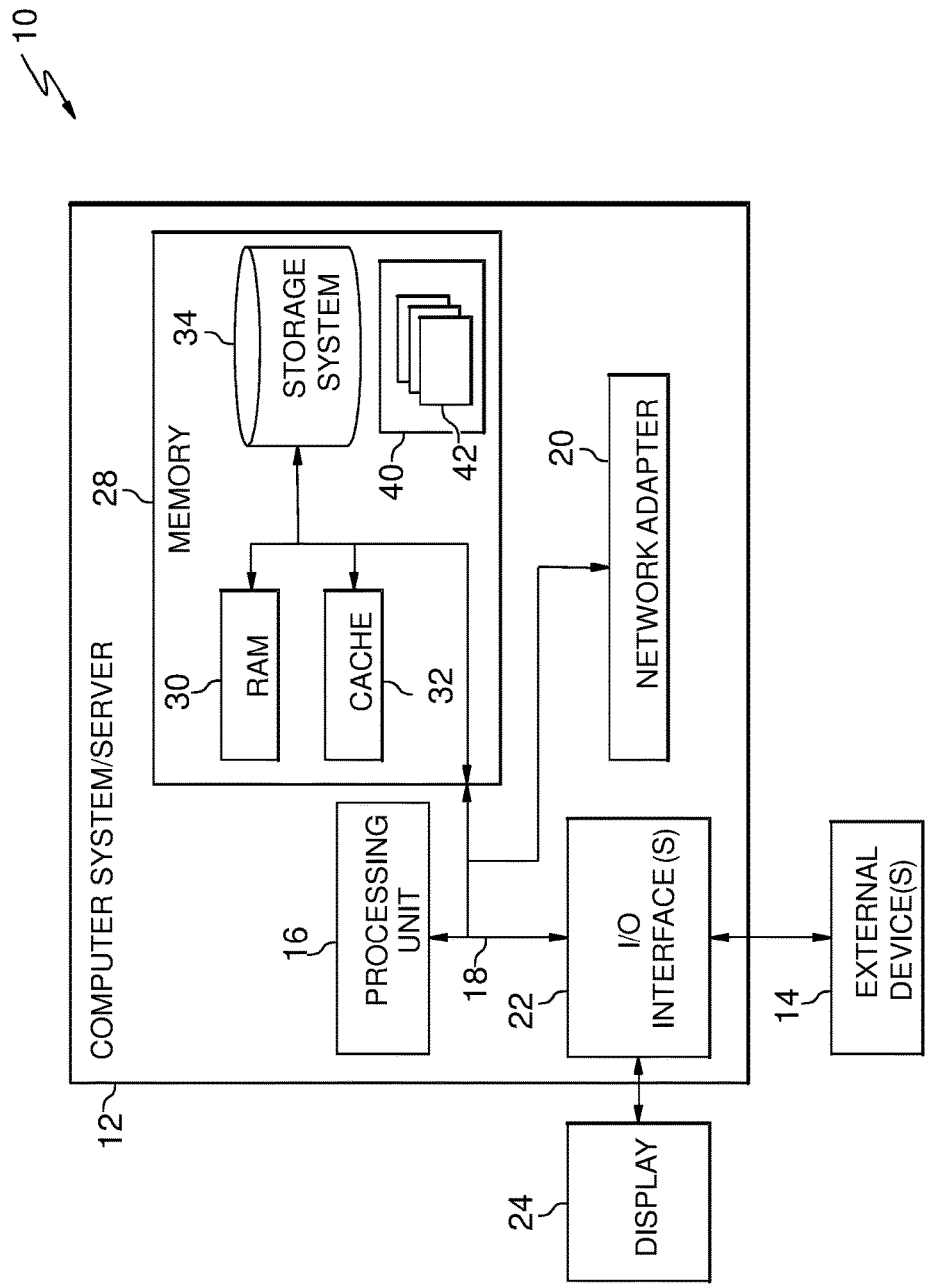
FIG. 1 depicts a cloud computing node according to an embodiment of the present invention.

The present invention generally relates to software plug-ins and, more particularly, to enhanced plug-ins for streamlining the invoking of services and creating workflow integrations. While plug-ins provide a level of convenience and modularity when incorporating new software functions, plug-ins can be problematic in their implementation. For example, plug-ins can be invoked only programmatically via calls made in the same language as the plug-in. Further, no standard technique exists to invoke plug-ins for example using a standard application programming interface (API), such as REST APIs. Consuming applications must run in the same framework were the plug-in is deployed, and plug-ins may not be invoked across the network.

Plug-ins may be beneficial in easily encapsulating information, such as specific business logic (e.g., data transformation) or to provide a simple interface to collect or send data from/to a specific product or endpoint. Thus, plug-ins may be useful to implement integration scenarios in which a subset of data is periodically extracted from a specific source (or is sent directly from that source), transformed/manipulated, and subsequently sent to a target endpoint. However, to implement such an integration scenario using plug-ins, developers may be required to write new code that invokes the plug-ins, coordinates their execution and facilitates the passing of resulting data from one plug-in as input to another one.

Aspects of the presentation may include an improved or enhanced plug-in having one or more interfaces that may be used for invoking the plug-in services from other applications running on the same or different framework. In embodiments, the services of the enhanced plug-in may be invoked (e.g., via the one or more interfaces) using a variety of application programming interface (API) calls from remote applications that are written in a variety of languages. In other words, the services of the enhanced plug-in may be invoked with standard interfaces and without the need for specialized coding. Further, the enhanced plug-in may include interfaces for integrating workflows by receiving information, processing the information by invoking the services of the enhanced plug-in, and passing the processed information to another component (e.g., another enhanced plug-in, another application, etc.). In this way, the services of the enhanced plug-in can be invoked without the need for a developer to write new code for invoking the plug-in, coordinate the execution of services, and facilitate the passing of resulting data from one plug-in as input to another one. As a result, enhanced plug-ins may be used to easily implement a workflow in which each enhanced plug-in serves a particular function for processing data that was previously processed by a preceding enhanced plug-in in the workflow or chain of enhanced plug-ins.

As described herein the enhanced plug-in may include a group of functions not typically implemented in ordinary plug-ins. For example, the enhanced plug-in may implement doGet( ) doPost( ) and/or other functions for processing HTTP-GET and HTTP-POST requests. In this way, applications may interface with the enhanced plug-in to invoke services using standard requests rather than by custom code.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
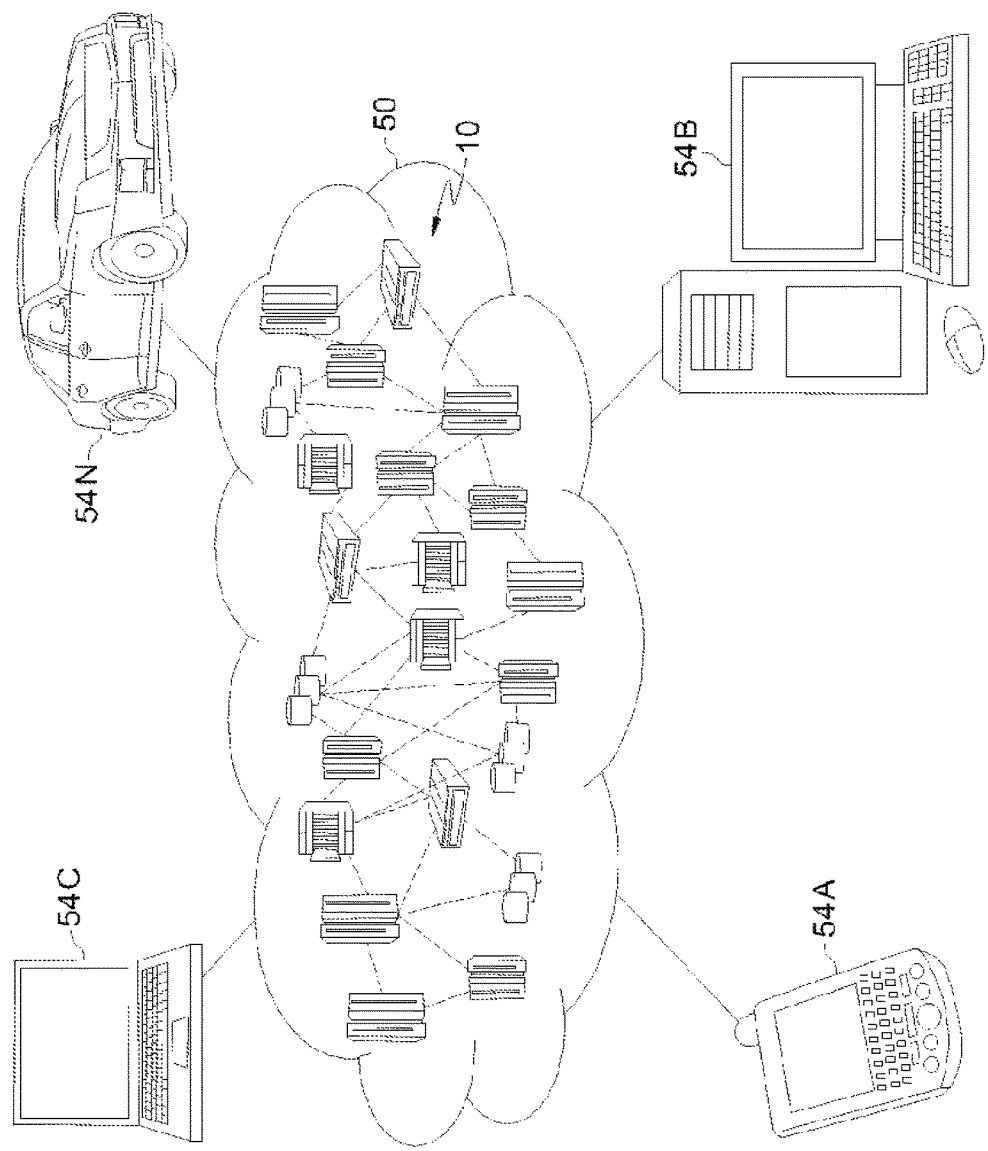
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
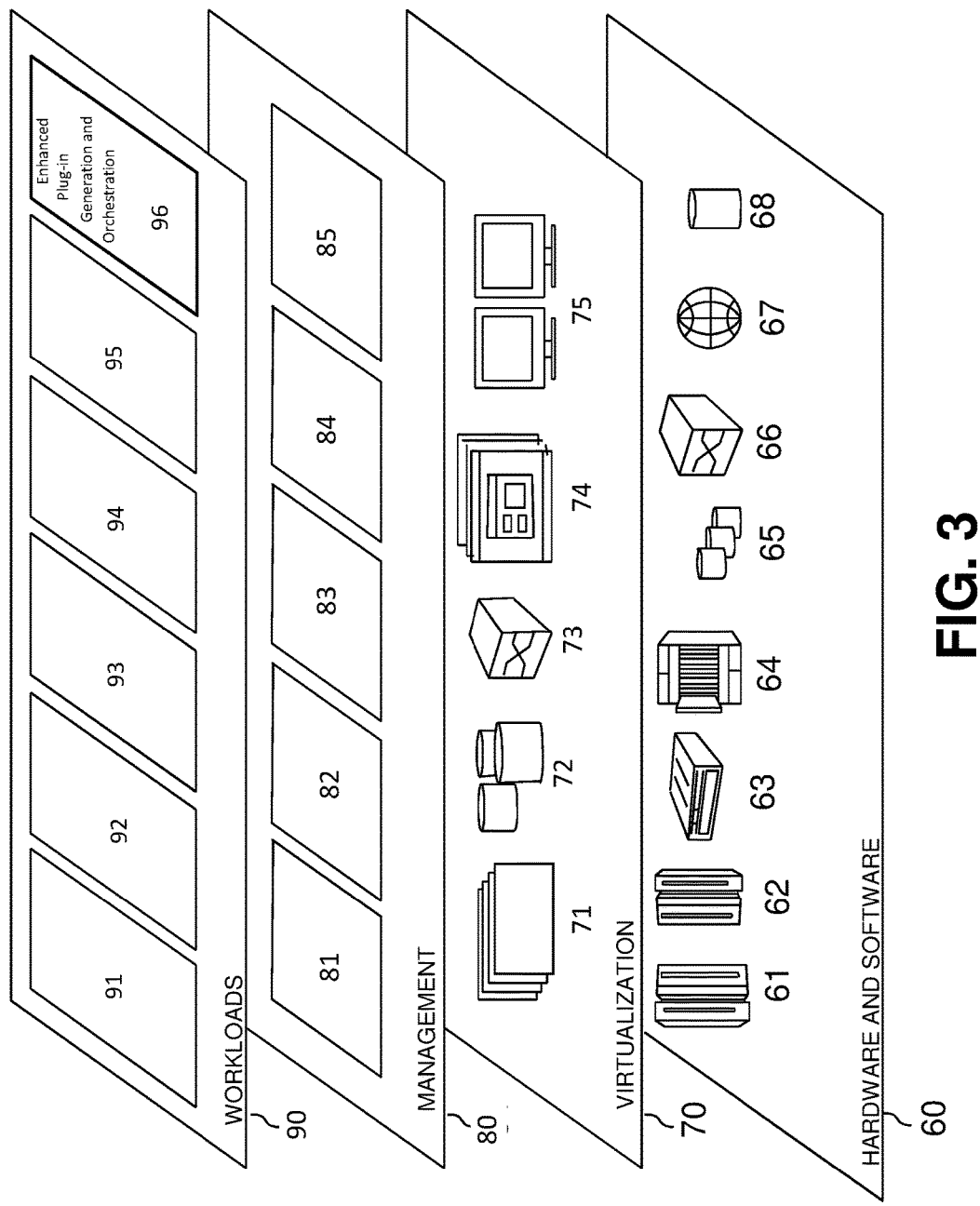
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and enhanced plug-in generation and orchestration 96.

Referring back to FIG. 1, the program/utility 40 may include one or more program modules 42 that generally carry out the functions and/or methodologies of embodiments of the invention as described herein (e.g., such as the functionality provided by enhanced plug-in generation and orchestration 96). Specifically, the program modules 42 may receive user input for composing an enhanced plug-in having interfaces for invoking plug-in services by applications that run on the same or different framework as the enhanced plug-in, and invoked using non-customized coding. Further, the program modules 42 may receive user input for creating a workflow to chain together the services of multiple enhanced plug-ins, receive user input for scheduling the execution of the workflow, and execute the workflow in accordance with the schedule and/or the satisfaction of other criteria that stipulate when the workflow should be executed. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a plug-in enhancement server as shown in FIG. 4A.

Figure 4A:
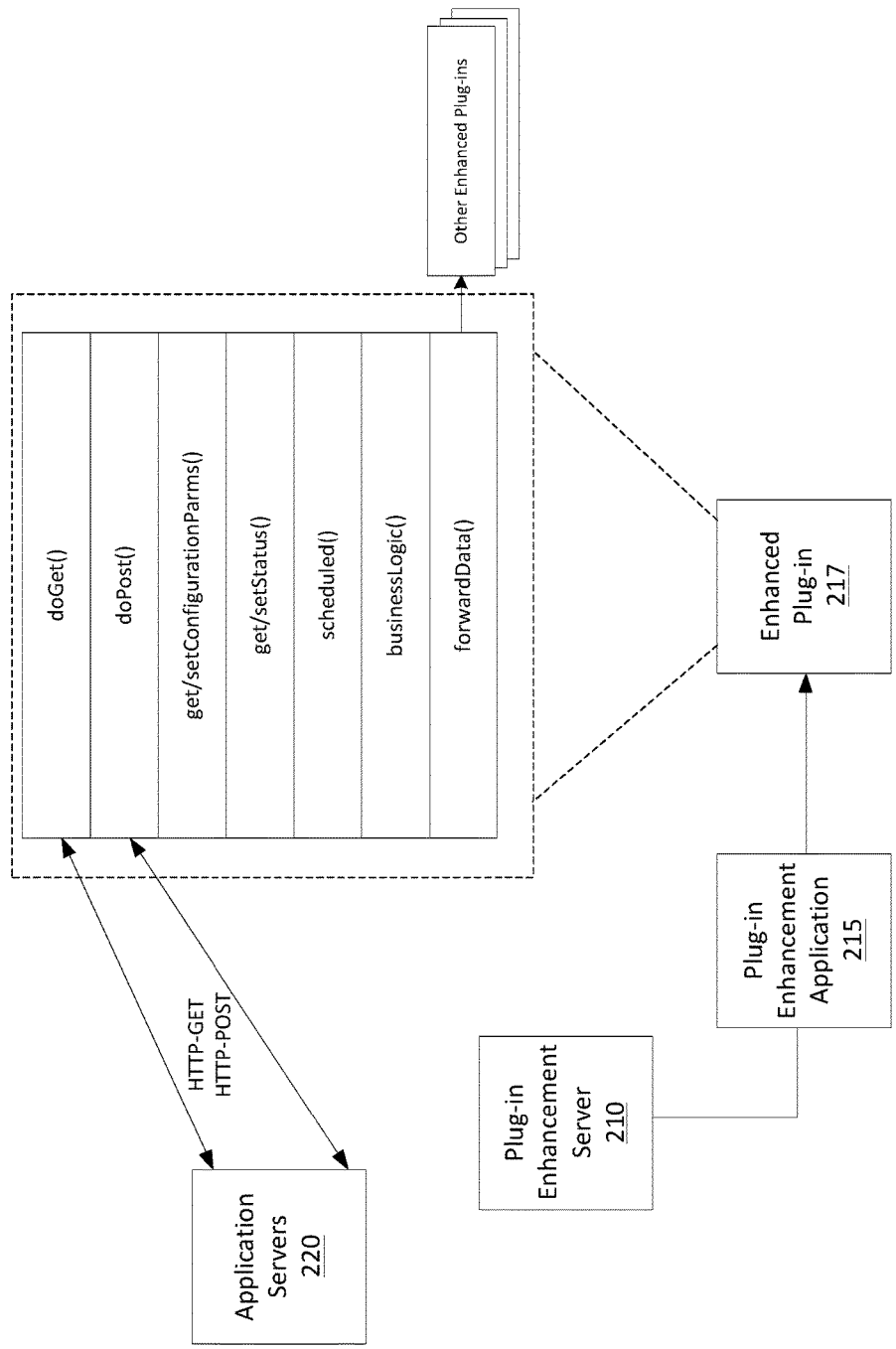
FIGS. 4A and 4B show an overview of an example implementation in accordance with aspects of the present invention.
Figure 4B:
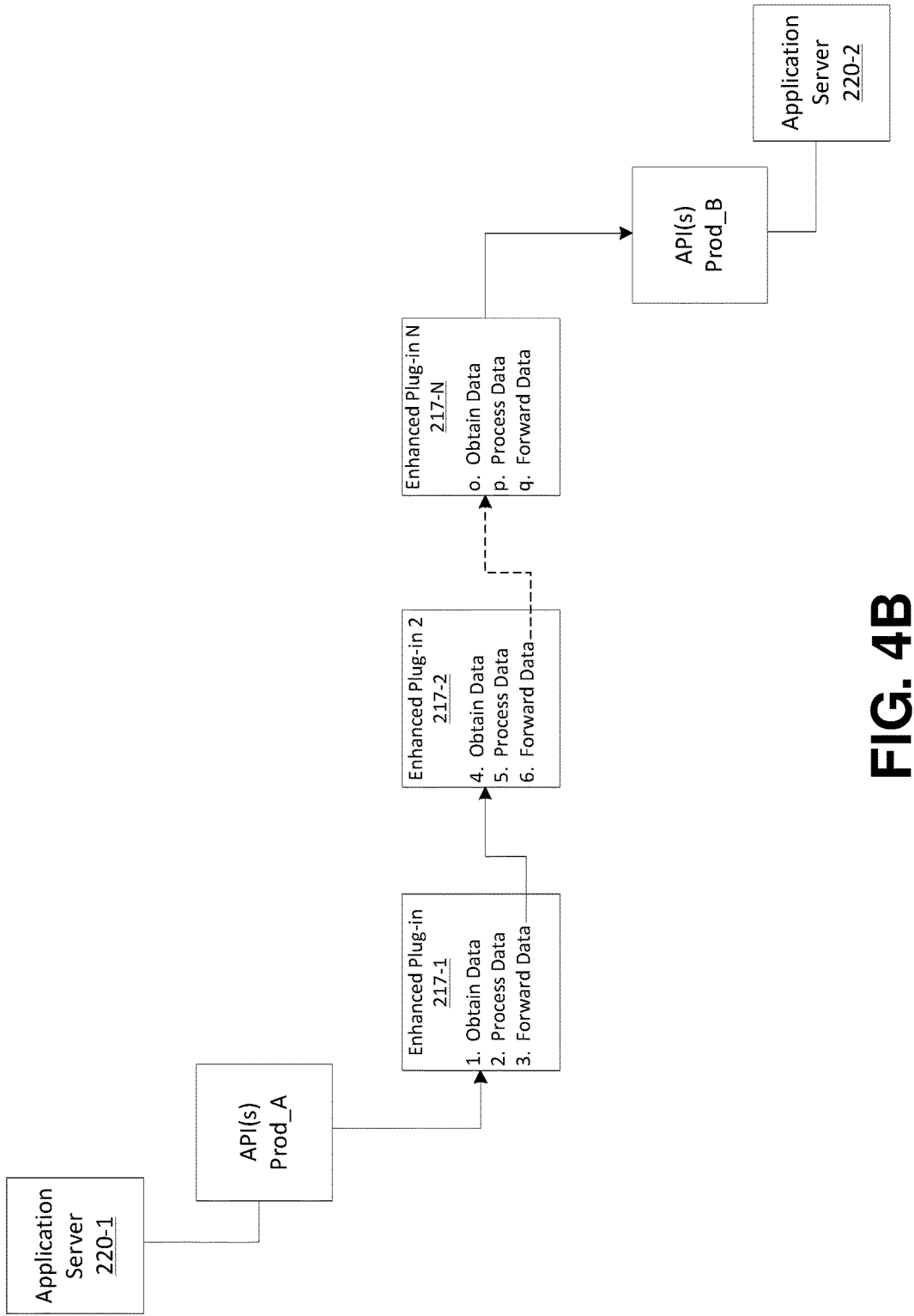

FIGS. 4A and 4B show an overview of an example implementation in accordance with aspects of the present invention. As shown in FIG. 4A, a plug-in enhancement server 210 may include a plug-in enhancement application 215. The plug-in enhancement application 215 may be used for two main purposes. In particular, the plug-in enhancement application 215 may be used for the development of an enhanced plug-in. Additionally, the plug-in enhancement application 215 may be used for chaining multiple enhanced plug-ins together to create a workflow, as is described herein.

The enhanced plug-in 217 may include a software plug-in, such as a plug-in conforming to the Open Services Gateway initiative (OSGi) standard. As described herein, the enhanced plug-in 217 may be enhanced inasmuch as the enhanced plug-in 217 includes a stack of functions, services, components, and/or interfaces that allow the service of the enhanced plug-in 217 to be invoked in a standardized manner (e.g., by an application that is running in the same or different framework as the enhanced plug-in 217). For example, the enhanced plug-in 217 services can be invoked using standard API calls, such as REST API calls and/or other types of standard API calls. Also, enhanced plug-in 217 services may be invoked without the need for developers to create specialized codes/scripts for chaining multiple enhanced plug-ins 217 together in a workflow. As described herein, the enhanced plug-in 217 may include a stack of components that allow the enhanced plug-in 217 to be invoked without the need for applications to be running in the same framework as the enhanced plug-in 217. As further described herein, the enhanced plug-in 217 may include a technique to store and implement business logic and/or other configuration parameters that define the manner in which the enhanced plug-in 217 processes input data. Additionally, or alternatively, the enhanced plug-in 217 may include functionality for periodically scheduling the execution of the business logic. Additionally, or alternatively, the enhanced plug-in 217 may include functionality for forwarding data processed by the business logic and/or configuration parameters of the enhanced plug-in 217 to subsequent enhanced plug-ins 217 and/or an endpoint application in a workflow. Additionally, or alternatively, the enhanced plug-in 217 may include functionality for setting and/or reporting an execution or runtime status of the enhanced plug-in 217 (e.g., running, error, success, etc.).

As described herein, and as shown in FIG. 4A, the enhanced plug-in 217 may be invoked in a standardize manner by implementing the "doGet( )" and "doPost( )" techniques to process HTTP-GET and HTTP-POST requests received from APIs implemented by application servers 220. For example, the enhanced plug-in 217 may be invoked by processing HTTP-GET and HTTP-POST requests that are used to receive or send data to and from application servers 220, depending on the function/services of the enhanced plug-in 217. The enhanced plug-in 217 may also include a "get/setConfigurationParams( )" component which may implement a technique used to receive configuration parameters from the plug-in enhancement application 215 via user input. As described herein, the configuration parameters may specify the services provided by the enhanced plug-in 217, and the functions to perform based on receiving certain data (e.g., data from application servers 220 and/or data from other enhanced plug-ins 217, as will be described in greater detail herein). The enhanced plug-in 217 may also include a "businessLogic( )" component which may implement a technique to obtain information specifying how certain data is to be processed, created, stored, and/or modified.

The enhanced plug-in 217 may also include a "get/setStatus( )" component which may be used to set the status of the enhanced plug-in 217 (e.g., indicating whether the enhanced plug-in 217 is idle, processing data, experiencing an error, etc.) and to obtain the status of the enhanced plug-in 217. The enhanced plug-in 217 may also include a "scheduled( )" component to receive user input indicating a schedule and/or other criteria that stipulate when the enhanced plug-in 217 should be invoked. As an illustrative example, the "scheduled( )" component may receive a schedule to that invokes the enhanced plug-in 217 to obtain data from a particular API of a particular application server 220 at a particular time, or to invoke the enhanced plug-in 217 to process data when data is received from another enhanced plug-in 217. The enhanced plug-in 217 may further include a "forwardData( )" component that implements a technique to forward processed data to another enhanced plug-in 217 in a chain of enhanced plug-ins 217 included in a workflow, or to another API hosted by an application server 220. In embodiments, the enhanced plug-in 217 may make an HTTP-POST request to provide data to a subsequent enhanced plug-in 217 in a chain of enhanced plug-ins 217 and the subsequent enhanced plug-in 217 may process the HTTP-POSTrequest using the doPost( ) technique in order to receive the data from the preceding enhanced plug-in 217. In embodiments, the enhanced plug-in 217 may be stored and implemented by an application, web server, or other type of computing device.

As further shown in FIG. 4B, a series of enhanced plug-ins 217 (e.g., enhanced plug-in 217-1 through enhanced plug-in 217-N) may be chained together to create a workflow. For example, the plug-in enhancement application 215 may be used by a developer to develop each enhanced plug-in 217 and chain the enhanced plug-ins 217 together. In the illustrative example of FIG. 4B, enhanced plug-in 217-1 may include a set of instructions to obtain data via API calls to a product (e.g., "Prod_A") hosted by application server 220-1, process the data in accordance with processing/configuration parameters and business logic, and provide the processed data to another enhanced plug-in 217 (e.g., enhanced plug-in 217-2) as input to enhanced plug-in 217-2. For example, enhanced plug-in 217-1 may obtain data by using an HTTP-GET request, and provide data to enhanced plug-in 217-2 using the HTTP-POST request. Enhanced plug-in 217-2 may obtain the data by processing the HTTP-POST request using the doGet( ) interface. Further, enhanced plug-in 217-2 may process the data, and provide the processed data as input to a subsequent enhanced plug-in 217 in the chain. Any number of enhanced plug-ins 217 may be included in the chain in order to execute a workflow of tasks in which each task is performed by an individual enhanced plug-in 217, and an output of the task is provided as input to a subsequent enhanced plug-in 217 in the chain. In the example of FIG. 4B, data from the final enhanced plug-in 217 in the chain is provided via API calls to Prod_B hosted by application server 220-2. In this way, enhanced plug-ins 217 may be developed and used to implement a workflow using standard interfaces for receiving and providing data without the need for developers to re-write code or require enhanced plug-in 217 services to be invoked from within the same framework as the application.

As described herein, each enhanced plug-in 217 may be implemented by a single computing device or by multiple different distributed computing devices hosting different applications running on the same or different network and framework. Further, each enhanced plug-in 217 may communicate with each other even when implemented in applications running on the same or different network and framework as a result of incorporating the doGet( ) and doPost( ) interfaces and techniques.

Figure 5:
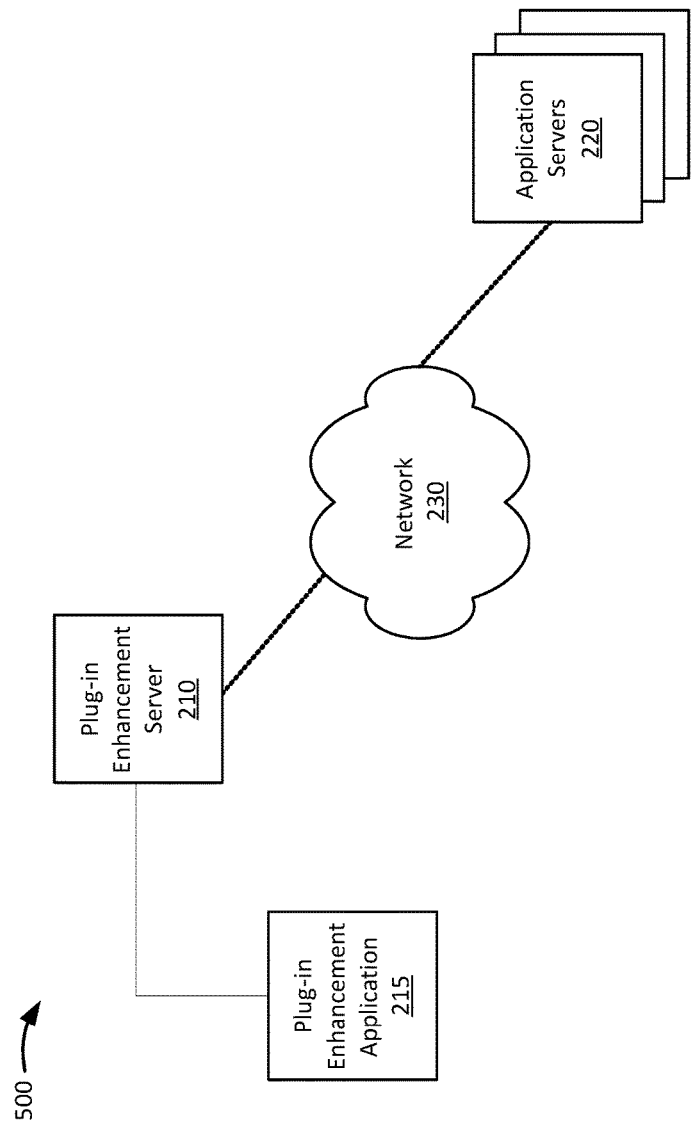
FIG. 5 shows an example environment in accordance with aspects of the present invention.

FIG. 5 shows an example environment in accordance with aspects of the present invention. As shown in FIG. 5, environment 500 may include a plug-in enhancement server 210, application servers 220, and network 230. In embodiments, one or more components in environment 500 may correspond to one or more components in the cloud computing environment of FIG. 2. In embodiments, one or more components in environment 500 may include the components of computer system/server 12 of FIG. 1.

The plug-in enhancement server 210 may include a computing device (e.g., such as computer system/server 12 of FIG. 1). For example, the plug-in enhancement server 210 may correspond to desktop computing or server device, and/or another type of computing device. As described herein, the plug-in enhancement server 210 may include a plug-in enhancement application 215 that may be used for the development of enhanced plug-ins 217 and/or the orchestration of enhanced plug-in 217 workflows. For example, the plug-in enhancement application 215 may be used to receive user input that links or chains together multiple different enhanced plug-ins 217 for creating a workflow or series of tasks involving the services provided by each enhanced plug-in 217. As described herein, the plug-in enhancement application 215 may invoke a workflow by sending data to an enhanced plug-in 217, which causes the enhanced plug-in 217 to process the data and send processed data as input to a subsequent enhanced plug-in 217 in the chain. Additionally, or alternatively, the plug-in enhancement application 215 may direct an application server 220 to invoke a workflow by directing the application server 220 to send data to the first enhanced plug-in 217 in a workflow. Additionally, or alternatively, the plug-in enhancement application 215 may publish information to a directory indicating that a new workflow is available, and an application server 220 may invoke the workflow in order to perform a task using the workflow. In embodiments, the plug-in enhancement application 215 may be used to identify the runtime status of an enhanced plug-in 217 (e.g., whether the enhanced plug-in 217 is idle, processing data, experiencing an error, successful in processing the data, etc.). The plug-in enhancement application 215 may report the runtime status in a visual manner to a user.

The application servers 220 may include one or more computing devices (e.g., such as computer system/server 12 of FIG. 1) that host various web-based applications (e.g., gaming applications, account service applications, news applications, etc.). The application servers 220 may implement one or more enhanced plug-ins 217 and may invoke a workflow by sending data to an enhanced plug-in 217. In embodiments, an application server 220 may invoke the workflow using a standard API call (e.g., a REST API call and/or other type of API call). Since the enhanced plug-in 217 includes a stack of functions and interfaces that can process HTTP-GET and HTTP-POST requests, the enhanced plug-in 217 may be invoked when an application server 220 is on a different network and operating on a different framework than that of an application or server implementing the enhanced plug-in 217.

The network 230 may include network nodes, such as network nodes 10 of FIG. 2. Additionally, or alternatively, the network 230 may include one or more wired and/or wireless networks. For example, the network 230 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 230 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 500 is not limited to what is shown in FIG. 5. In practice, the environment 500 may include additional devices and/or networks; fewer devices and/or networks; different devices and/or networks; or differently arranged devices and/or networks than illustrated in FIG. 5. Also, in some implementations, one or more of the devices of the environment 500 may perform one or more functions described as being performed by another one or more of the devices of the environment 500. Devices of the environment 500 may interconnect via wired connections, wireless connections, or a combination of wired and wireless connections.

Figure 6:
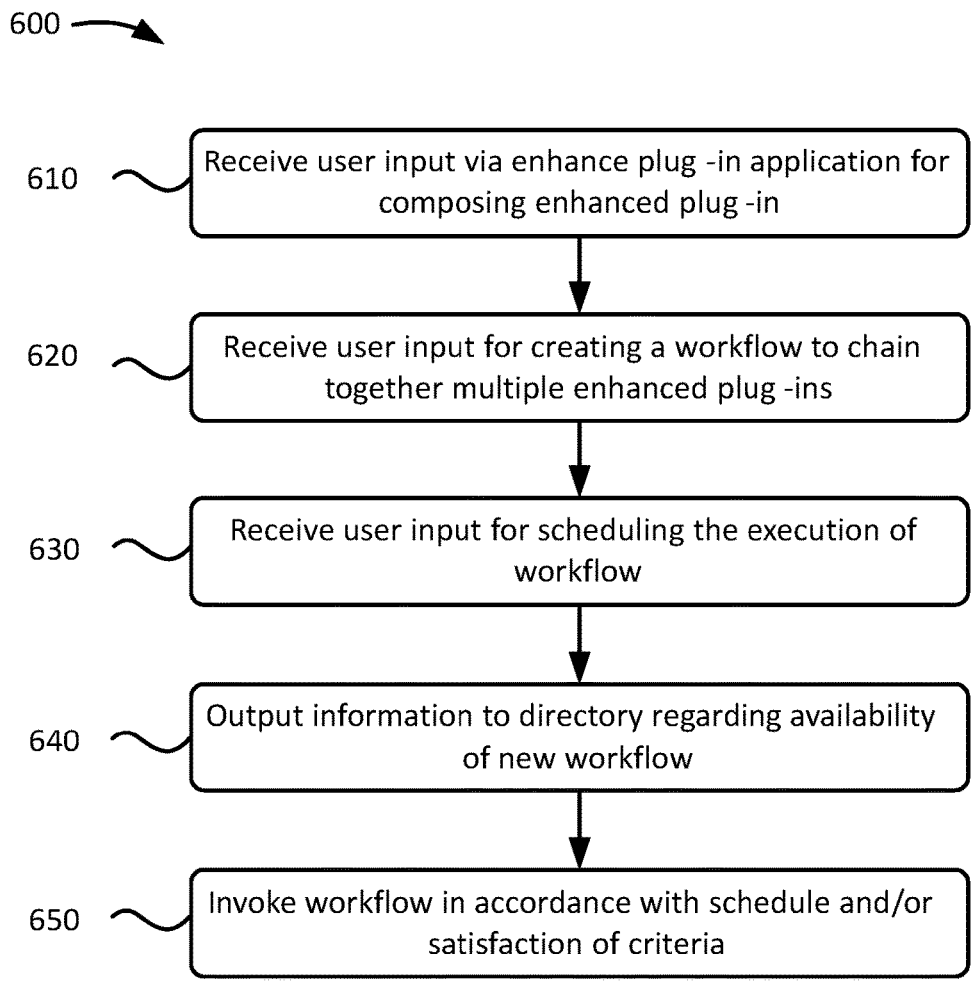
FIG. 6 shows an example flowchart of a process for developing an enhanced plug-in and chaining the enhanced plug-ins together to create a workflow using the enhanced plug-ins in accordance with aspects of the present invention.

FIG. 6 shows an example flowchart of a process for developing an enhanced plug-in 217 and chaining the enhanced plug-ins 217 together to create a workflow using the enhanced plug-ins 217 in accordance with aspects of the present invention. The steps of FIG. 6 may be implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention.

As shown in FIG. 6, process 600 may include receiving user input via an enhanced plug-in 217 application for composing an enhanced plug-in 217 (step 610). For example, the plug-in enhancement server 210 may receive user input via the plug-in enhancement application 215 to compose an enhanced plug-in 217. As described herein, the user input for composing the enhanced plug-in 217 may include information regarding configuration parameters that define the services that the enhanced plug-in 217 is to provide and the manner in which input data is to be processed by the enhanced plug-in 217. In embodiments, the enhanced plug-in 217 may receive, store, and/or process the configuration parameters using the "get/setConfigurationParams( )" component as shown in FIG. 4A. In embodiments, the plug-in enhancement server 210 may receive user input for business logic that defines how data is created, processed, stored, and/or forwarded by the enhanced plug-in 217. In embodiments, the enhanced plug-in 217 receive, store, and/or process the business logic via the "businessLogic( )" component as shown in FIG. 4A.

Process 600 may also include receiving user input for creating a workflow to chain together multiple enhanced plug-ins 217 (step 620). For example, the plug-in enhancement application 215 may receive user input that defines a subsequent enhanced plug-in 217 or subsequent API call to make for forwarding data processed/output by the businessLogic( ) component. In embodiments, the plug-in enhancement application 215 may store information identifying the subsequent enhanced plug-in 217 or subsequent API call in the "forwardData( )" component. In embodiments, the plug-in enhancement application 215 may receive user input for defining the subsequent enhanced plug-in 217 or subsequent API call for multiple different enhanced plug-ins 217. In this way, the plug-in enhancement application 215 may be used to chain together multiple enhanced plug-ins 217 for creating a workflow.

Process 600 may further include receiving user input for scheduling the execution of a workflow (step 630). For example, the plug-in enhancement application 215 may receive user input for scheduling the execution of a workflow and may store the scheduling information, via the "scheduled( )" component (as shown in FIG. 4A) in an enhanced plug-in 217 that is at the beginning of the workflow. As described herein, scheduling information may identify that the workflow should be invoked at certain periodic intervals, certain times during the day, etc.

Process 600 may also include outputting information to a directory regarding the availability of a new workflow (step 640). For example, the plug-in enhancement application 215 may output information to a directory (e.g., hosted by the plug-in enhancement server 210 and/or another computing device) regarding the availability of a new workflow. In embodiments, plug-in enhancement application 215 may output the information in a structured format for storing in a data structure. For example, the plug-in enhancement application 215 may output information indicating a name of the workflow, a type of workflow, a brief description of the workflow, applications involved with the workflow, etc. As described herein, application servers 220 may discover workflows from the directory and may invoke workflows having certain characteristics or attributes. Additionally, or alternatively, a developer may use the information in the directory to identify a new workflow and identify which workflows should be invoked in connection with an application. As an example, the directory may identify that a new workflow is available for a financial data application. Thus, a developer may update code in an application server 220 that hosts the financial data application to invoke the new workflow. Alternatively, the application server 220 may automatically update its own code to invoke the new workflow by discovering the new workflow in the directory and determining that the new workflow pertains to the financial data application hosted by the application server 220.

Process 600 may further include invoking a workflow in accordance with the schedule and/or satisfaction of criteria (step 650). For example, the plug-in enhancement application 215 may invoke a workflow in accordance with a schedule (e.g., in accordance with the scheduling information received at step 630). Additionally, or alternatively, the plug-in enhancement application 215 may invoke the workflow based on satisfaction of other criteria (e.g., when new data is available for processing, and/or when some other event meeting certain conditions occurs). In embodiments, the plug-in enhancement application 215 may invoke the workflow by instructing an endpoint application server 220 to send input data to the first enhanced plug-in 217 in the workflow chain.

As described herein, a workflow (e.g., a series of enhanced plug-ins 217) may be invoked by a application server 220 (e.g., in accordance with business rules, a schedule, and/or other criteria). For example, the application server 220 may invoke a workflow independently of the plug-in enhancement server 210 by discovering the workflow from the directory. Additionally, or alternatively, a workflow may be invoked by the plug-in enhancement server 210 (e.g., in accordance with a schedule and/or satisfaction of criteria). As such, a workflow having a chain of enhanced plug-ins 217 can be invoked in a flexible manner in which multiple different techniques may be used to invoke the workflow as is appropriate or desired for different situations.

Figure 7:
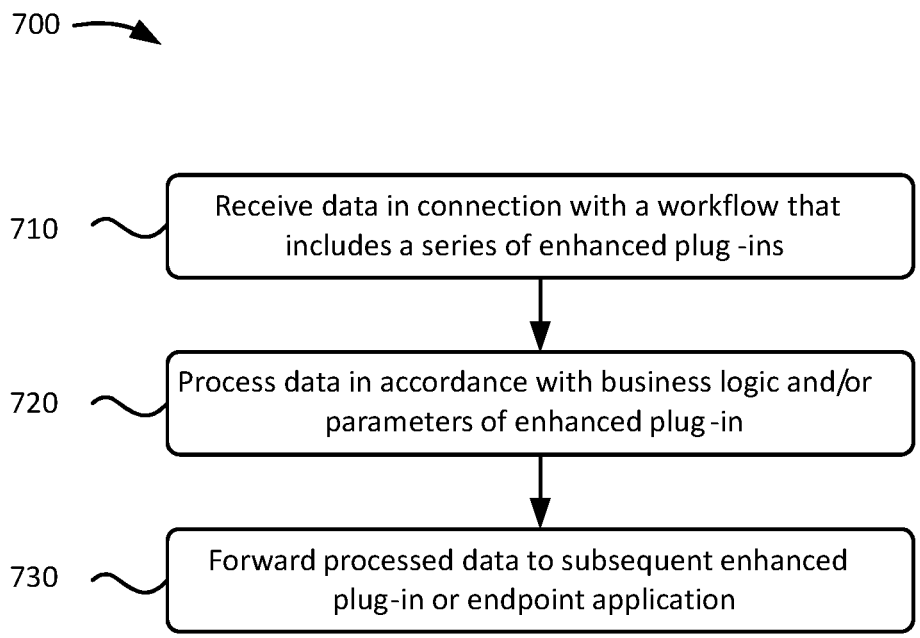
FIG. 7 shows an example flowchart of a process for executing a workflow by enhanced plug-ins in accordance with aspects of the present invention.

FIG. 7 shows an example flowchart of a process for executing a workflow by enhanced plug-ins in accordance with aspects of the present invention. The steps of FIG. 7 may be implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention.

As shown in FIG. 7, process 700 may include receiving data in connection with a workflow that includes a series of enhanced plug-ins (step 710). For example, a server or computing device (e.g., application server 220) that implements an enhanced plug-in 217 may receive data in connection with a workflow. In embodiments, the enhanced plug-in 217 may be the first enhanced plug-in 217 in a workflow that receives input data from an application via an API call including an HTTP-POST request. Alternatively, the enhanced plug-in 217 may be an intermediate enhanced plug-in in the workflow, or the last enhanced plug-in in the workflow. As described herein, since the enhanced plug-in 217 includes functionality for processing an HTTP-POST request, the enhanced plug-in 217 may receive the input data from an application that is running on either the same or different framework as the enhanced plug-in 217. More specifically, the enhanced plug-in 217 may be invoked by receiving input data via standardized API calls, such as REST API calls, or the like.

Process 700 may further include processing data in accordance with business logic and/or parameters of the enhanced plug-in (step 720). For example, the enhanced plug-in 217 may process the input data (received at step 710) with business logic and/or parameters as included in the "businessLogic( )" and "get/setConfigurationParams( )" components of the enhanced plug-in 217.

Process 700 may also include forwarding the processed data to a subsequent enhanced plug-in or an endpoint application (step 730). For example, the enhanced plug-in 217 may forward the processed data to a subsequent enhanced plug-in 217 in the workflow or to an endpoint application via an API call based on the information stored by the "forwardData( )" component of the enhanced plug-in 217. If the enhanced plug-in 217 is the first or an intermediate enhanced plug-in 217 in the workflow, the enhanced plug-in 217 may forward the processed data to a subsequent enhanced plug-in 217 in the workflow (e.g., using an HTTP-POST request). If the enhanced plug-in 217 is the last enhanced plug-in 217 in the workflow, the enhanced plug-in 217 may forward the processed data to the endpoint application via an API call including an HTTP-POST request).

In accordance with process 700, enhanced plug-ins 217 may be used to implement a workflow. Since the enhanced plug-ins 217 incorporate the doGet( ) and doPost( ) techinques, the enhanced plug-ins 217 may be invoked in a standardized manner (e.g., using standard API calls, such as REST API calls and/or other types of standard API calls). Also, enhanced plug-in 217 services may be invoked without the need for developers to create specialized codes/scripts for chaining multiple enhanced plug-ins 217 together in a workflow, and without the need for applications to invoke the services of the enhanced plug-in 217 using the same framework and network as the enhanced plug-in 217. As further described herein, the enhanced plug-in 217 may include a technique to store and implement business logic and/or other configuration parameters that define the manner in which the enhanced plug-in 217 processes input data. Additionally, or alternatively, the enhanced plug-in 217 may include functionality for periodically scheduling the execution of the business logic.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, by a computing device, user input for composing a first enhanced plug-in, wherein the first enhanced plug-in includes one or more logical components for invoking the first enhanced plug-in by an application running in a different framework as the first enhanced plug-in;
receiving, by the computing device, user input for creating a workflow that includes a series of a plurality of enhanced plug-ins including the first enhanced plug-in and one or more subsequent second enhanced plug-ins; and
invoking, by the computing device, the workflow, wherein the invoking the workflow causes the first enhanced plug-in to receive data from an application running on the same or different framework as the first enhanced plug-in, process the data, and forward the processed data as input data to a particular one of the one or more subsequent second enhanced plug-ins or an endpoint application.

2. The method of claim 1, wherein the invoking the workflow includes directing the application to provide the data to the first enhanced plug-in via an application programming interface (API) call.

3. The method of claim 2, wherein the invoking the workflow includes invoking the workflow in accordance with a schedule.

4. The method of claim 2, wherein the invoking the workflow includes invoking the workflow based on the satisfaction of one or more criteria.

5. The method of claim 1, further comprising providing information regarding availability of the workflow to a directory to cause the application to discover the workflow, wherein the invoking the workflow is performed by the application independently of the computing device.

6. The method of claim 1, wherein the one or more logical components for invoking the first enhanced plug-in include at least one from the group consisting of:
a logical component implementing a doGet( )technique to process an HTTP-GET request; and
a logical component implementing a doPost( )technique to process an HTTP-POST request.

7. The method of claim 1, further comprising obtaining a runtime status from the first enhanced plug-in and reporting the runtime status.

8. The method of claim 1, wherein the data is processed based on business rules incorporated by the first enhanced plug-in.

9. The method of claim 8, wherein:
the receiving the user input for composing the first enhanced plug-in includes receiving the business rules,
the receiving the user input for creating the workflow includes receiving information that defines the particular one of the one or more subsequent second enhanced plug-ins or the endpoint application.

10. The method of claim 1, wherein the receiving the user input for composing the first enhanced plug-in, the receiving the user input for creating the workflow, and the invoking the workflow are provided by a service provider on a subscription, advertising, and/or fee basis.

11. The method of claim 1, wherein the computing device includes software provided as a service in a cloud environment.

12. The method of claim 1, further comprising deploying a system for creating the workflow to chain the series of the plurality of enhanced plug-ins, comprising providing a computer infrastructure operable to perform the receiving the user input for composing the first enhanced plug-in, the receiving the user input for creating the workflow, and the invoking the workflow.

13. The method of claim 1, wherein the enhanced plug-in includes a stack of functions, services, components, and interfaces that allows the service of the enhanced plug-in to be invoked in a standardized manner by the application that is running in a different framework as the enhanced plug-in, and
the stack of functions, services, components, and interfaces allows the service of the enhanced plug-in to be invoked in the standardized manner by a second application that is running in the same framework as the enhanced plug-in.

14. A computer program product for creating a workflow using a chained series of a plurality of enhanced plug-ins, the computer program product comprising a computer readable storage medium having program instructions embodied therewith, the program instructions executable by a computing device to cause the computing device to:
store a first enhanced plug-in, of the plurality of enhanced plug-ins, wherein the first enhanced plug-in includes one or more logical components for invoking the first enhanced plug-in by an application running in a different framework as the first enhanced plug-in;
receive data from the application running on the same or different framework as the first enhanced plug-in;
process the data in accordance with functions defined within the first enhanced plug-in; and
forward the data to a subsequent second enhanced plug-in or endpoint application.

15. The computer program product of claim 14, wherein the one or more logical components for invoking the first enhanced plug-in include at least one from the group consisting of:
a logical component implementing a doGet( )technique to process an HTTP-GET request; and
a logical component implementing a doPost( )technique to process an HTTP-POST request,
wherein in the receiving the data from the application includes making an application programming interface (API) call.

16. The computer program product of claim 14, further comprising reporting a runtime status from the first enhanced plug-in.

17. The computer program product of claim 14, wherein the one or more logical components include a stack of functions, services, components, and interfaces that allows the service of the enhanced plug-in to be invoked in a standardized manner by the application running in a different framework as the enhanced plug-in, and
the stack of functions, services, components, and interfaces allows the service of the enhanced plug-in to be invoked in the standardized manner by a second application that is running in the same framework as the enhanced plug-in.

18. A system comprising:
a CPU, a computer readable memory and a computer readable storage medium associated with a computing device;
an enhanced plugin stored by the computing device, wherein the enhanced plugin includes:
one or more logical components for invoking the enhanced plug-in by an application running in a different framework as the enhanced plug-in;
one or more logical components for implementing business logic that define the manner in which the enhanced plug-in processes input data; and
one or more logical components to forward data processed by the business logic or configuration parameters of the enhanced plug-in to subsequent enhanced plug-ins or an endpoint application in a workflow.

19. The system of claim 18, wherein the enhanced plug-in further includes a logical component for reporting the runtime status of the enhanced plug-in.

20. The system of claim 18, wherein the one or more logical components for invoking the enhanced plug-in include
a stack of functions, services, components, and interfaces that allows the service of the enhanced plug-in to be invoked in a standardized manner by the application running in a different framework as the enhanced plug-in, and
the stack of functions, services, components, and interfaces allows the service of the enhanced plug-in to be invoked in the standardized manner by a second application that is running in the same framework as the enhanced plug-in.

* * * * *